(12) United States Patent
Provenza

(10) Patent No.: US 11,820,470 B2
(45) Date of Patent: Nov. 21, 2023

(54) ADAPTIVE FORCE AUTOMOBILE EMERGENCY FLOTATION

(71) Applicant: US Gov't as represented by Secretary of Air Force, Wright-Patterson AFB, OH (US)

(72) Inventor: Jerry Provenza, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 751 days.

(21) Appl. No.: 17/008,967

(22) Filed: Sep. 1, 2020

(65) Prior Publication Data

US 2020/0391836 A1 Dec. 17, 2020

Related U.S. Application Data

(63) Continuation-in-part of application No. 16/190,740, filed on Nov. 14, 2018, now Pat. No. 10,710,721.

(60) Provisional application No. 62/907,775, filed on Sep. 30, 2019.

(51) Int. Cl.
*B63B 43/14* (2006.01)
*B60R 21/00* (2006.01)
*B60R 21/01* (2006.01)

(52) U.S. Cl.
CPC ...... *B63B 43/14* (2013.01); *B60R 2021/0016* (2013.01); *B60R 2021/01252* (2013.01); *B63B 2043/145* (2013.01)

(58) Field of Classification Search
CPC . B62K 5/10; B62K 5/027; B62K 5/05; B62K 5/08; B62L 1/00
See application file for complete search history.

(56) References Cited

U.S. PATENT DOCUMENTS

| | | | | |
|---|---|---|---|---|
| 5,431,515 | A * | 7/1995 | Sansone | B60P 7/12 410/125 |
| 7,287,482 | B1 * | 10/2007 | Banchetto | B63B 43/14 340/623 |
| 9,290,144 | B1 * | 3/2016 | Cox | B60R 21/013 |
| 2003/0197599 | A1 * | 10/2003 | Kim | B63C 9/24 340/573.6 |

(Continued)

*Primary Examiner* — Paul N Dickson
*Assistant Examiner* — Shams Dhanani
(74) *Attorney, Agent, or Firm* — AFMCLO/JAZ; Richard M. Mescher

(57) ABSTRACT

An emergency vehicle flotation system has bladder(s) attached in a compressed state on a vehicle. An inflation initiating component comprising a selected one or more of a submersion sensor attached to the vehicle to detect water pressure indicative of submersion of the vehicle and a user interface device. Selectable force gas generator(s) (SFGGs) have one gas-generating propellant cells that are individually fired. The SFGG(s) have conduit(s) that receive gas from fired gas-generating propellant cells and direct the gas to inflate the bladder(s). A controller is communicatively coupled to the inflation initiating component and the gas-generating propellant cells of the one or more SFGGs. The controller enables the emergency vehicle flotation system to receive an inflation signal from the inflation initiating component, and to fire a selected number of the more than one gas-generating propellant cells to at least partially inflate the bladder(s).

20 Claims, 6 Drawing Sheets

(56) References Cited

U.S. PATENT DOCUMENTS

| | | | |
|---|---|---|---|
| 2006/0043712 A1* | 3/2006 | Hakki | B60R 21/36 |
| | | | 280/735 |
| 2012/0090521 A1* | 4/2012 | Zablocki | B63C 7/003 |
| | | | 114/121 |
| 2013/0305977 A1* | 11/2013 | Dondurur | B60R 21/00 |
| | | | 114/123 |
| 2017/0341610 A1* | 11/2017 | Tu | B60R 21/02 |
| 2020/0130622 A1* | 4/2020 | Lerner | B60W 50/0098 |
| 2020/0254949 A1* | 8/2020 | Kagulian | B60R 21/00 |
| 2021/0261076 A1* | 8/2021 | Pomish | B60R 21/01 |
| 2021/0323446 A1* | 10/2021 | Christensen | B60R 21/013 |
| 2022/0185215 A1* | 6/2022 | Shang | B60R 21/013 |

\* cited by examiner

ADAPTIVE FORCE AUTOMOBILE EMERGENCY FLOTATION

CROSS-REFERENCE TO RELATED APPLICATIONS

The present application claims the benefit under 35 USC § 119 of U.S. Provisional Application Ser. No. 62/907,775 filed 30 Sep. 2019 entitled "Adaptive Force Automobile Emergency Flotation". This application is a continuation-in-part patent application under 35 USC § 120 to commonly owned U.S. patent application Ser. No. 16/190,740 entitled "Airborne Store Ejection Using Selectable Force Gas Generator" filed 14 Nov. 2018, which in turn claims the benefit to U.S. Provisional Application Ser. No. 62/724,325 entitled "Airborne Store Ejection Using Selectable Force Gas Generator", filed 29 Sep. 2018, the content of both of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to land vehicle emergency flotation, and more particularly to automatically-deployed land vehicle emergency flotation systems.

2. Description of the Related Art

Occasionally, drivers of land vehicles such as passenger cars and trucks inadvertently drive off of the road surface into an adjacent body of water. The vehicle quickly submerges, disorienting the driver and any passengers. Although some people can succeed in getting out of the vehicle and to the surface, tragically many people in submerged vehicles drown.

BRIEF SUMMARY

According to aspects of the present disclosure, an emergency vehicle flotation system includes one or more bladders attached in a compressed state on a vehicle. The emergency vehicle flotation system includes an inflation initiating component comprising a selected one or more of: (i) a submersion sensor attached to the vehicle to detect water pressure indicative of submersion of the vehicle; and (ii) a user interface (UI) device. The emergency vehicle flotation system includes one or more selectable force gas generators (SFGGs). Each SFGG includes more than one gas-generating propellant cells that are individually fired. Each SFGG includes one or more conduits that receive gas from fired gas-generating propellant cells and direct the gas to inflate at least one of the one or more bladders. A controller is communicatively coupled to the inflation initiating component and the more than one gas-generating propellant cells of the one or more SFGGs. The controller enables the emergency vehicle flotation system to receive an inflation signal from the inflation initiating component. The controller enables the emergency vehicle flotation system to fire a selected number of the more than one gas-generating propellant cells to at least partially inflate the one or more bladders.

According to aspects of the present disclosure, a vehicle includes a vehicle body and an emergency vehicle flotation system. The emergency vehicle flotation system includes one or more bladders attached in a compressed state on the vehicle body. The emergency vehicle flotation system includes an inflation initiating component comprising a selected one or more of: (i) a submersion sensor attached to the vehicle to detect water pressure indicative of submersion of the vehicle; and (ii) a user interface (UI) device. The emergency vehicle flotation system includes one or more selectable force gas generators (SFGGs). Each SFGG includes more than one gas-generating propellant cells that are individually fired. Each SFGG includes one or more conduits that receive gas from fired gas-generating propellant cells and direct the gas to inflate at least one of the one or more bladders. A controller is communicatively coupled to the inflation initiating component and the more than one gas-generating propellant cells of the one or more SFGGs. The controller enables the emergency vehicle flotation system to receive an inflation signal from the inflation initiating component. The controller enables the emergency vehicle flotation system to fire a selected number of the more than one gas-generating propellant cells to at least partially inflate the one or more bladders.

According to aspects of the present disclosure, a method is provided. In one or more embodiments, the method includes receiving an inflation signal from the inflation initiating component comprising a selected one or more of: (i) a submersion sensor attached to a vehicle to detect water pressure indicative of submersion of the vehicle; and (ii) a user interface (UI) device. The method includes, in response to receiving the inflation signal, firing a selected number of more than one gas-generating propellant cells of one or more SFGGs to at least partially inflate one or more bladders attached to the vehicle.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
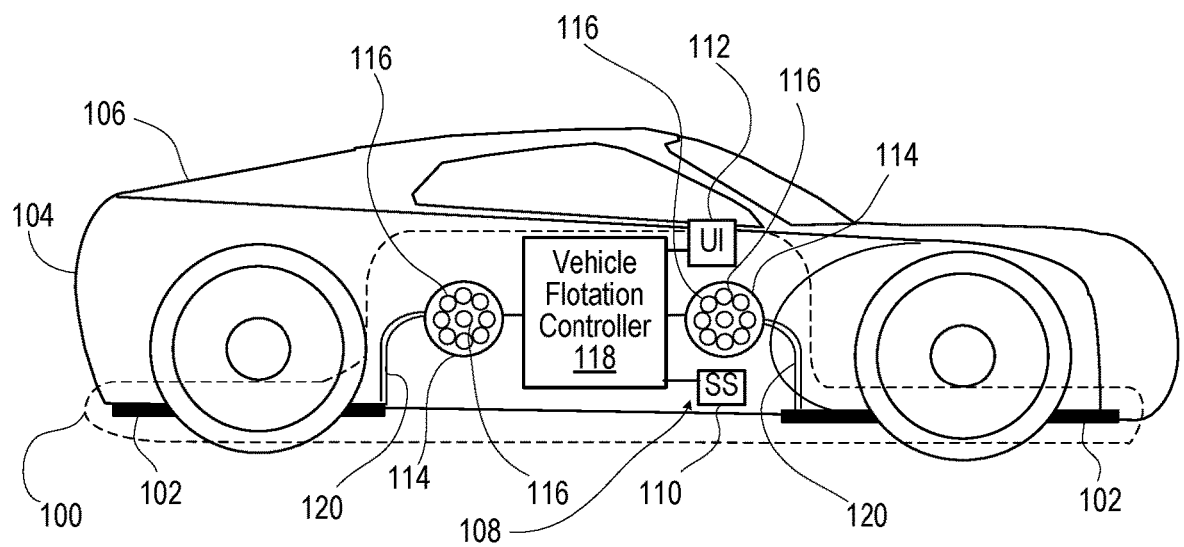
FIG. 1 is a side view of a vehicle having an emergency vehicle flotation system, according to one or more embodiments.

FIG. 1 depicts an emergency vehicle flotation system 100 having one or more bladders 102 attached in a compressed state on a vehicle body 104 of a vehicle 106. An inflation initiating component 108 comprising a selected one or more of: (i) a submersion sensor (SS) 110 attached to the vehicle 106 to detect water pressure indicative of submersion of the vehicle 106; and (ii) a user interface (UI) device 112. One or more selectable force gas generators (SFGGs) 114 each have more than one gas-generating propellant cells 116. A vehicular flotation controller ("controller") 118 individually fires the gas-generating propellant cells 116 to create adaptive amount of inflation to the bladder(s) 102 as directed by one or more conduits 120.

Figure 2:
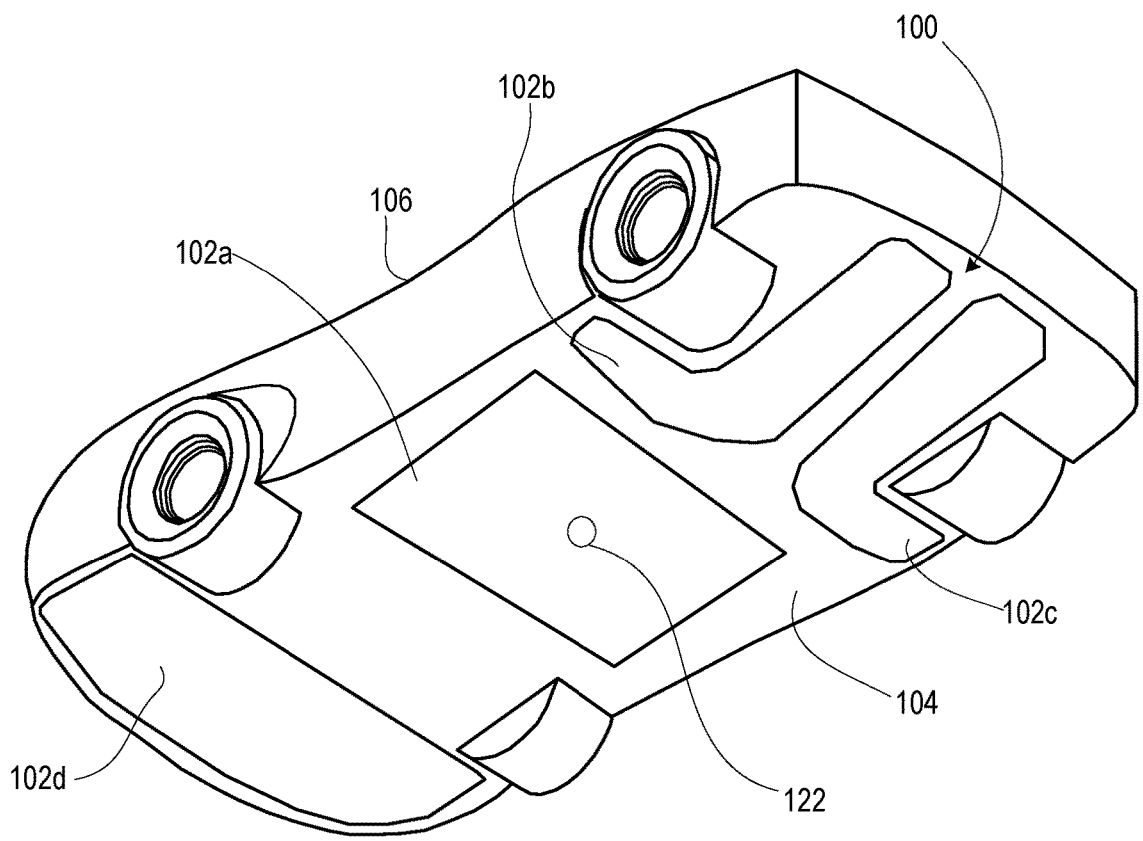
FIG. 2 is a bottom view of the vehicle having attached compressed bladders of the emergency vehicle flotation system, according to one or more embodiments.

FIG. 2 depicts a bottom view of the vehicle having attached compressed bladders 102a-102d of the emergency vehicle flotation system 100 attached to an underside of the vehicle body 104 of the vehicle 106. Center bladder 102a is placed about a center of gravity 122 of the vehicle 106. In one or more embodiments center bladder 102a is the only bladder 102 (FIG. 1). Other bladders 102b-102d are offset from the center of gravity 122 to assist in floating the vehicle 106 and compensating for asymmetric loading of vehicle 106. For example, left and right front bladders 102b-102c can assist with a front heavy or laterally offset loading. Rear bladder 102d can assist with a rear heavy loading.

Figure 3A:
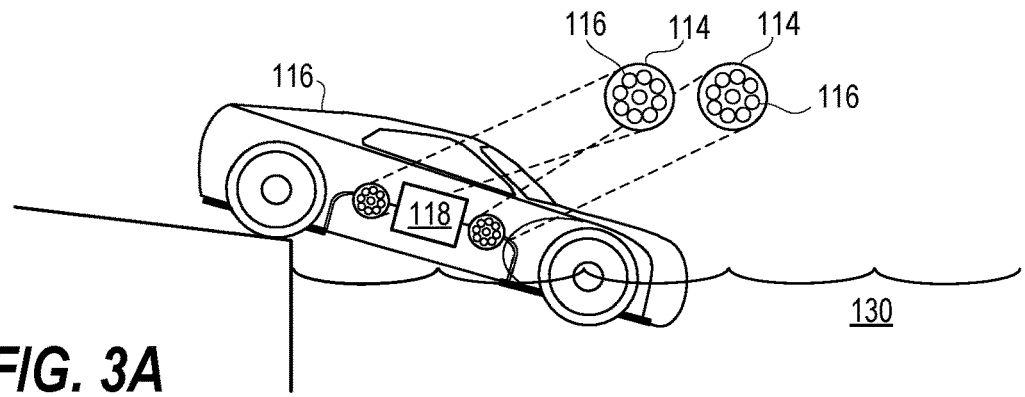
FIG. 3A is a side view of the vehicle entering water with unfired selectable force gas generators (SFGGs) of the emergency vehicle flotation system, according to one or more embodiments.

FIGS. 3A-3D depict a sequence of operation of the emergency vehicle flotation system 100. FIG. 3A is a side view of the vehicle 106 entering water 130 with unfired gas-generating propellant cells 116 in SFGGs 114 of the emergency vehicle flotation system 100. The controller 118 awaits a firing signal.

Figure 3B:
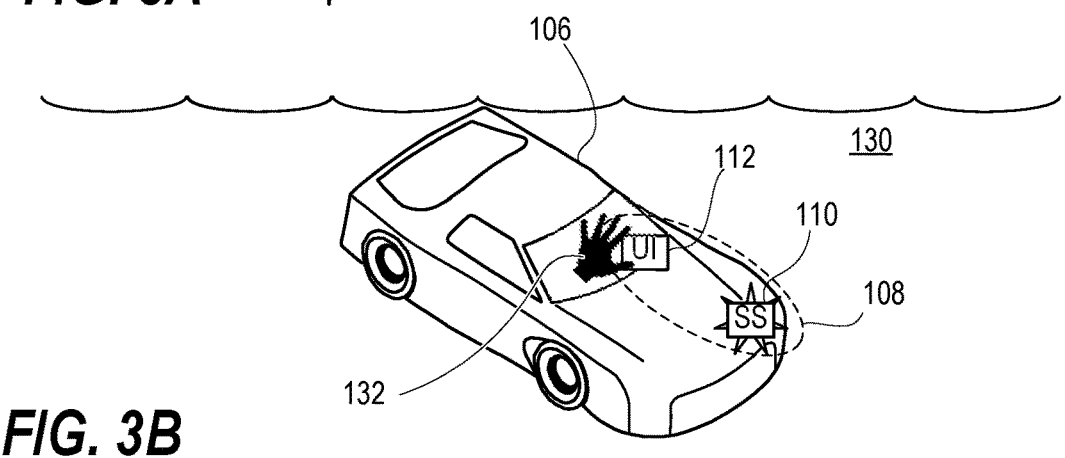
FIG. 3B is a side view of the vehicle submerged in water with an inflation initiating component of the emergency vehicle flotation system being triggered, according to one or more embodiments.

FIG. 3B is a side view of the vehicle 106 submerged in water 130 with the emergency vehicle flotation system 100 being triggered by an inflation signal from the inflation initiating component 108 of. For example, the submersion sensor 110 indicates a depth of submersion of the vehicle 106. For another example, UI 112 provides a manual activation signal triggered by user 132.

Figure 3C:
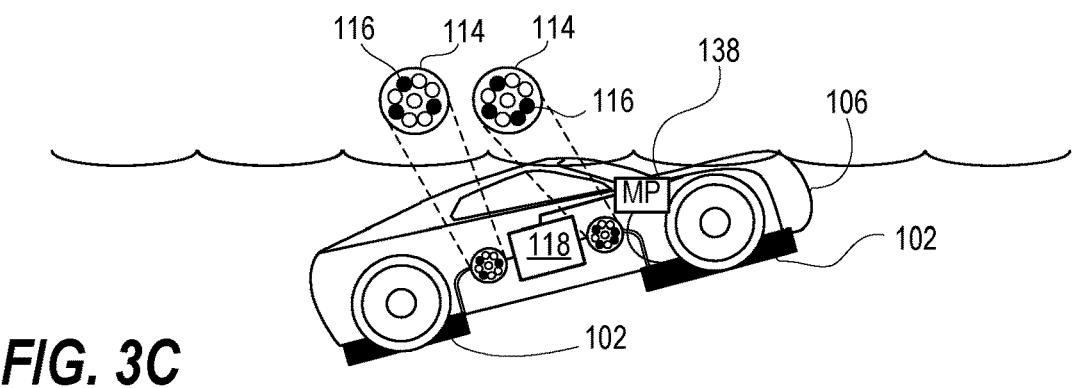
FIG. 3C is a side view of the vehicle rising in water after firing a selected number of gas-generating propellant cells of the SFGGs, according to one or more embodiments.

FIG. 3C is a side view of the vehicle 106 rising in water 130 after firing a selected number of gas-generating propellant cells 116 of the SFGGs 114. In one or more embodiments, the controller 118 selects the number of the more than one gas-generating propellant cells 116 based at least in part on the depth of submersion to maintain flotation of the vehicle 106. In one or more embodiments, the controller 118 sequentially fires the selected number of gas-generating propellant cells 116 based at least in part on limiting peak pressure in the one or more conduits 120 and the one or more bladders 102. In one or more embodiments, the controller 118 selects the number of the more than one gas-generating propellant cells 116 based on a configuration setting received from UI 112, For example, the weight of a class of vehicle can be associated with a particular size and number of bladders 102.

Figure 3D:
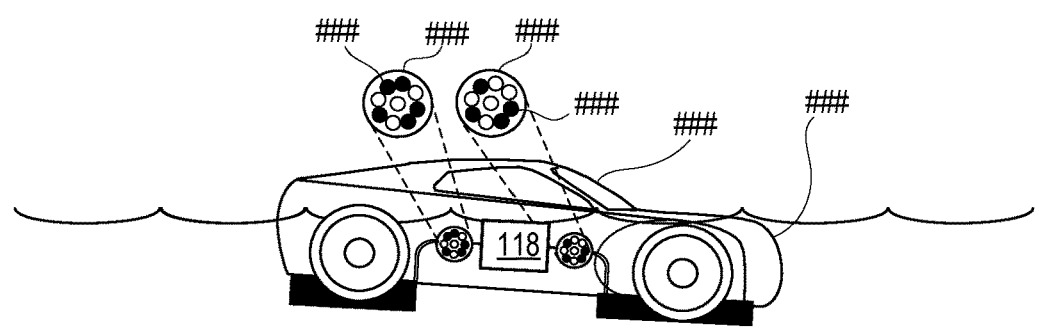
FIG. 3D is a side view of the vehicle with an upper part of a passenger cabin out of the water after firing an additional selected number of the gas-generating propellant cells of the SFGGs, according to one or more embodiments.

FIG. 3D is a side view of the vehicle 106 with an upper part of a passenger cabin 136 out of the water 130 after firing an additional selected number of the gas-generating propellant cells 116 of the SFGGs 114. The controller 118 can respond to additional water infiltration, loads beyond the nominal configuration, gas leakage from the bladders 102, etc., by firing additional gas-generating propellant cells 116 over time. In one or more embodiments, the controller 118 receive the orientation of the vehicle 106 from a three-axis motion and position sensor 138. Listing or canting of the vehicle 106 can be corrected by differential inflation of bladders 102.

Figure 4:
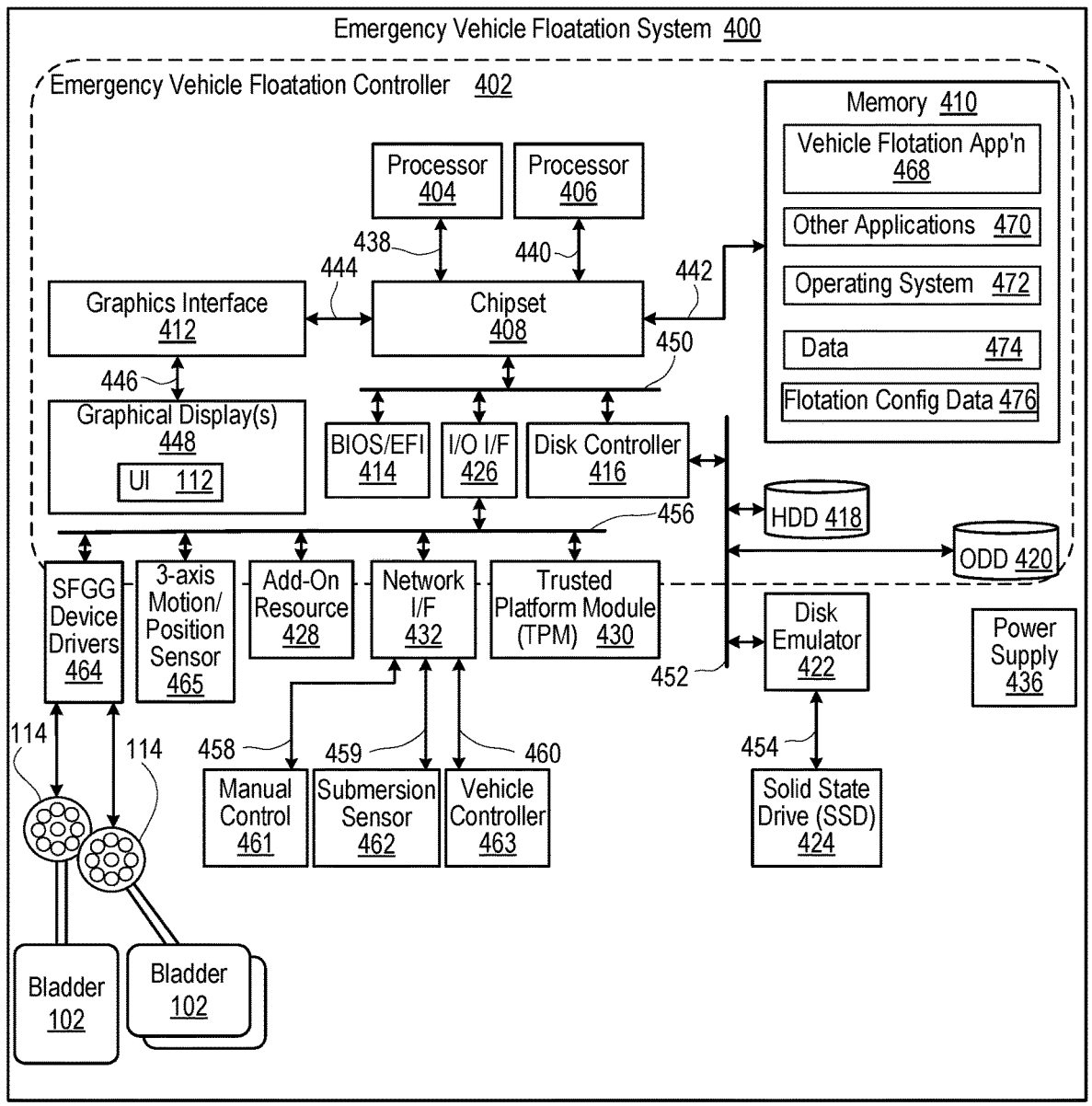
FIG. 4 is a diagrammatic illustration of an exemplary hardware and software environment of the emergency vehicle flotation system, according to one or more embodiments.

FIG. 4 is a diagrammatic illustration of an exemplary hardware and software environment of an emergency vehicle flotation system 400, such as emergency vehicle flotation system 100 (FIG. 1), customized to implement an emergency vehicle flotation controller 402 consistent with embodiments of the innovation. Emergency vehicle flotation system 400 is in part a customized information handling system (IHS) 100 that performs at least a part of the methodologies and features as described herein. Emergency vehicle flotation system 400 can include processing resources for executing machine-executable code, such as a central processing unit (CPU), a programmable logic array (PLA), an embedded device such as a System-on-a-Chip (SoC), or other control logic hardware. Emergency vehicle flotation system 400 can also include one or more computer-readable medium for storing machine-executable code, such as software or data. Additional components of Emergency vehicle flotation system 400 can include one or more storage devices that can store machine-executable code, one or more communications ports for communicating with external devices, and various input and output (I/O) devices, such as a keyboard, a mouse, and a video display. Emergency vehicle flotation system 400 can also include one or more interconnects or buses operable to transmit information between the various hardware components.

Emergency vehicle flotation system 400 includes processors 404 and 406, chipset 408, memory 410, graphics interface 412, a basic input and output system/extensible firmware interface (BIOS/EFI) module 414, disk controller 416, hard disk drive (HDD) 418, optical disk drive (ODD) 420, disk emulator 422 connected to an external solid state drive (SSD) 424, input/output (I/O) interface (I/F) 426, one or more add-on resources 428, a trusted platform module (TPM) 430, network interface 432, and power supply 436. Processors 404 and 406, chipset 408, memory 410, graphics interface 412, BIOS/EFI module 414, disk controller 416, HDD 418, ODD 420, disk emulator 422, SSD 424, I/O interface 426, add-on resources 428, TPM 430, and network interface 432 operate together to provide a host environment of emergency vehicle flotation system 400 that operates to provide the data processing functionality of the information handling system. The host environment operates to execute machine-executable code, including platform BIOS/EFI code, device firmware, operating system code, applications, programs, and the like, to perform the data processing tasks associated with emergency vehicle flotation system 400.

In a host environment, processor 404 is connected to chipset 408 via processor interface 438, and processor 406 is connected to the chipset 408 via processor interface 440. Memory 410 is connected to chipset 408 via a memory bus 442. Graphics interface 412 is connected to chipset 408 via a graphics bus 444, and provides a video display output 446 to graphical display(s) 448 that presents UI 112. In a particular embodiment, emergency vehicle flotation system 400 includes separate memories that are dedicated to each of processors 404 and 406 via separate memory interfaces. An example of memory 410 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 414, disk controller 416, and I/O interface 426 are connected to chipset 408 via an I/O channel 450. An example of I/O channel 450 includes a Peripheral Component Interconnect (PCI) interface, a PCI-Extended (PCI-X) interface, a high speed PCI-Express (PCIe) interface, another industry standard or proprietary communication interface, or a combination thereof. Chipset 408 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 414 includes BIOS/EFI code operable to detect resources within emergency vehicle flotation system 400, to provide drivers for the resources, initialize the resources, and access the resources. BIOS/EFI module 414 includes code that operates to detect resources within emergency vehicle flotation system 400, to provide drivers for the resources, to initialize the resources, and to access the resources.

Disk controller 416 includes a disk interface 452 that connects the disk controller to HDD 418, to ODD 420, and to disk emulator 422. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 422 permits SSD 424 to be connected to emergency vehicle flotation system 400 via an external interface 454. An example of external interface 454 includes a USB interface, an IEEE 1394 (Firewire) interface, a proprietary interface, or a combination thereof. Alternatively, solid-state drive 164 can be disposed within emergency vehicle flotation system 400.

I/O interface 426 includes a peripheral interface 456 that connects the I/O interface to add-on resource 428, to TPM 430, and to network interface 432. Peripheral interface 456 can be the same type of interface as I/O channel 442, or can be a different type of interface. As such, I/O interface 426 extends the capacity of I/O channel 442 when peripheral interface 456 and the I/O channel are of the same type, and the I/O interface translates information from a format suitable to the I/O channel to a format suitable to the peripheral channel 456 when they are of a different type. Add-on resource 428 can include a data storage system, an additional graphics interface, a network interface card (NIC), a sound/video processing card, another add-on resource, or a combination thereof. Add-on resource 428 can be on a main circuit board, on separate circuit board or add-in card disposed within emergency vehicle flotation system 400, a device that is external to the information handling system, or a combination thereof.

Network interface 432 represents a network interface controller (NIC) disposed within emergency vehicle flotation system 400, on a main circuit board of the information handling system, integrated onto another component such as chipset 408, in another suitable location, or a combination thereof. Network interface 432 includes network channels 458 and 460 that provide interfaces to devices that are external to emergency vehicle flotation system 400. In a particular embodiment, network channels 458 and 460 are of a different type than peripheral channel 456 and network interface 432 translates information from a format suitable to the peripheral channel to a format suitable to external devices. An example of network channels 458 and 460 includes InfiniBand channels, Fibre Channel channels, Gigabit Ethernet channels, proprietary channel architectures, or a combination thereof. Network channels 458-460 can be connected to external network resources such as a manual control 461, a submersion sensor 462, and a vehicle controller 463. The network resource can include another information handling system, a data storage system, another network, a grid management system, another suitable resource, or a combination thereof. SFGG device drivers 464 can generate firing signals that trigger SFGGs 114 to inflate bladders 102. Three axis motion and position sensor 465 indicates orientation of the vehicle 106 (FIG. 1).

Within memory 410, HDD 418, ODD 420, or SSD 424, one or more software and/or firmware modules and one or more sets of data can be stored that can be utilized during operations of emergency vehicle flotation system 400. These one or more software and/or firmware modules can be loaded into memory 410 during operation of the emergency vehicle flotation system 400. Specifically, in one embodiment, memory 410 can include therein a plurality of such modules, including an emergency vehicle flotation application 468, one or more other applications 470, operating system (OS) 472, and data 474. One example of data is flotation configuration data 476 These software and/or firmware modules have varying functionality as disclosed herein when their corresponding program code is executed by processors 404, 406.

Figure 5:
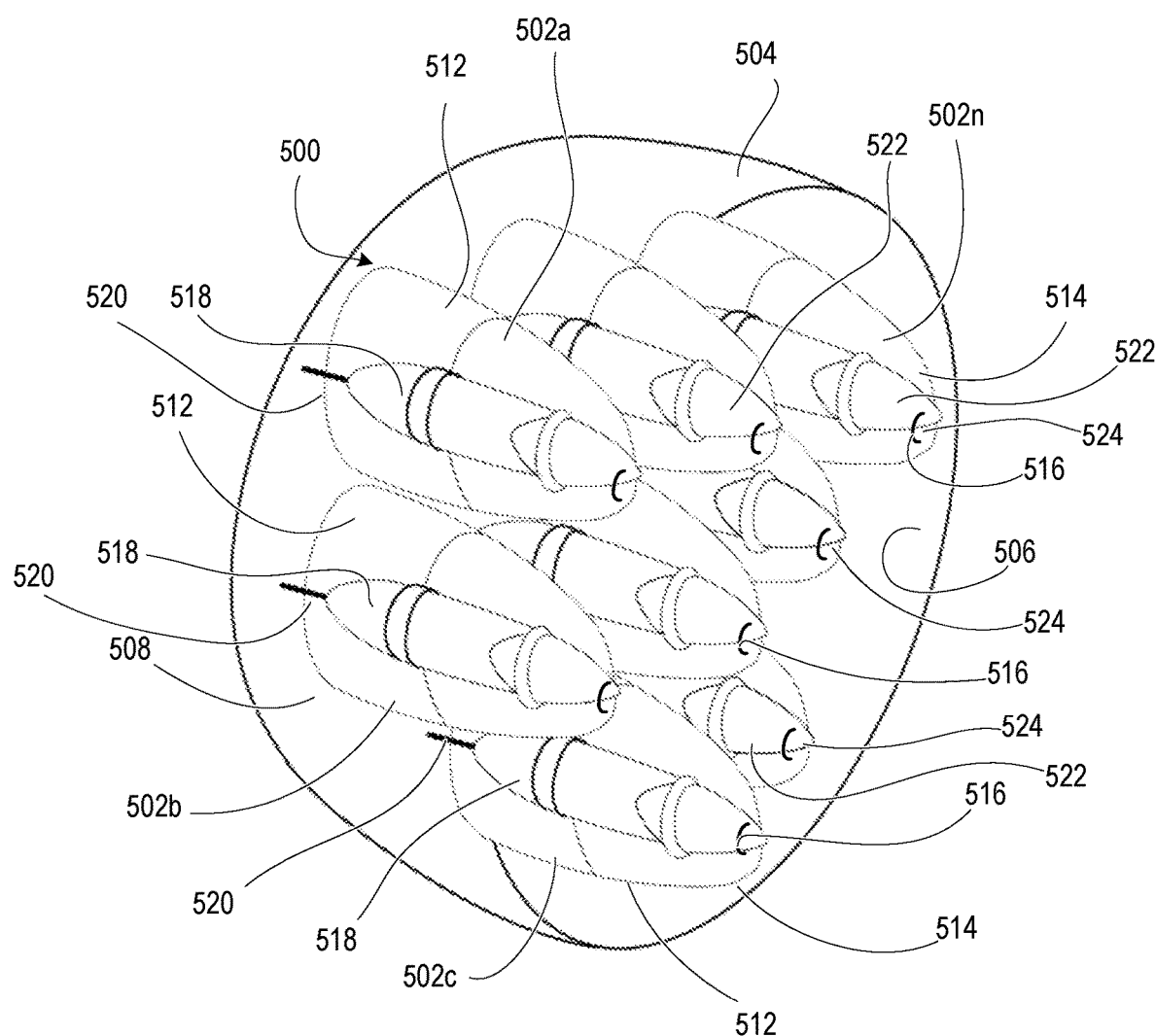
FIG. 5 is perspective view of an SFGG that enables selecting a pattern of firing of gas generating propellant shells for a desired peak and duration of gas pressure, according to one or more embodiments.

FIG. 5 is perspective view of a selectable force gas generator (SFGG) 500 that enables selecting a pattern of firing of gas generating propellant shells 502 a 502n for a desired peak and duration of gas pressure. A housing 504 is attachable to an ejector mechanism of an airborne store support assembly of an aircraft (not shown). The housing 504 contains a gas collection chamber 506. Honeycomb structure 508 provides support material that is contained in the housing 504 adjacent to the gas collection chamber 506. Gas-generating propellant cells 502a 502n are partially embedded in the honeycomb structure 508. Honeycomb structure 508 provides a light weight option for airborne applications, although other support materials may be used.

Each gas-generating propellant cell 502 a 502n includes a steel jacket 512 having a convex portion 514 exposed to the gas collection chamber 506. The steel jacket 512 has a thickness sufficient to withstand increased outer pressure from initiation of another gas-generating propellant cell 502 a 502n. Steel is an example of a strong material that resists sympathetic detonation but other materials may be used according to aspects of the present disclosure. The steel jacket 512 includes an orifice 516 through the convex portion 514. A propellant packet 518 is contained in the steel jacket 512. A fire wire 520 is electrically connectable to an electrically-fired initiator (not shown). The fire wire 520 is electrically connected to the propellant packet 518. The fire wire 520 transmits a firing signal that causes the propellant packet 518 to rapidly produce gas. A cap 522 is positioned between the propellant packet 518 and the steel jacket 512. The cap 522 has a tip 524 that blocks the orifice 516 of the steel jacket 512 from increased outer pressure in the gas collection chamber 506 to prevent sympathetic detonation of the propellant packet 518.

Figure 6:
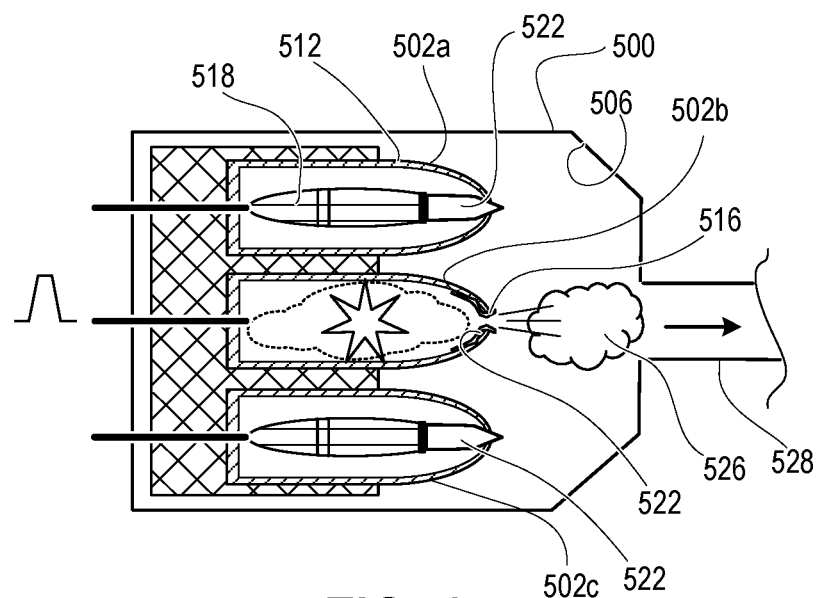
FIG. 6 is a simplified diagrammatic view of the SFGG of FIG. 5 with one gas generator firing without sympathetic firing by two unfired gas generators, according to one or more embodiments.
Figure 7:
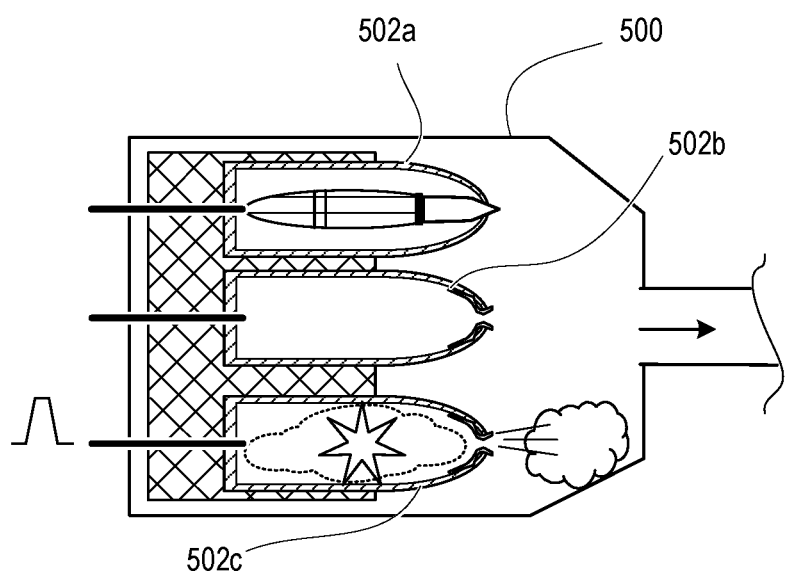
FIG. 7 is a simplified diagrammatic view of the SFGG of FIG. 6 with a second gas generator firing without sympathetic firing by the remaining unfired gas generator, according to one or more embodiments.

FIG. 6 depicts the SFGG 500 having gas-generating propellant cell 502 a 502c with one gas-generating propellant cell 502b firing. Cap 522 is ruptured and/or orifice 516 is expanded by increased gas pressure internal to steel jacket 512, allowing gas 526 to enter gas collection chamber 506 and to be guided by gas conduit 528 to an ejection mechanism (not shown). Adjacent gas-generating propellant cells 502 a, 502c do not fire due to sympathetic detonation. FIG. 7 depicts the SFGG 500 with gas-generating propellant cell 502b fully expended. Gas-generating propellant cell 502c is firing without causing sympathetic detonation of gas-generating propellant cell 502a.

Figure 8:
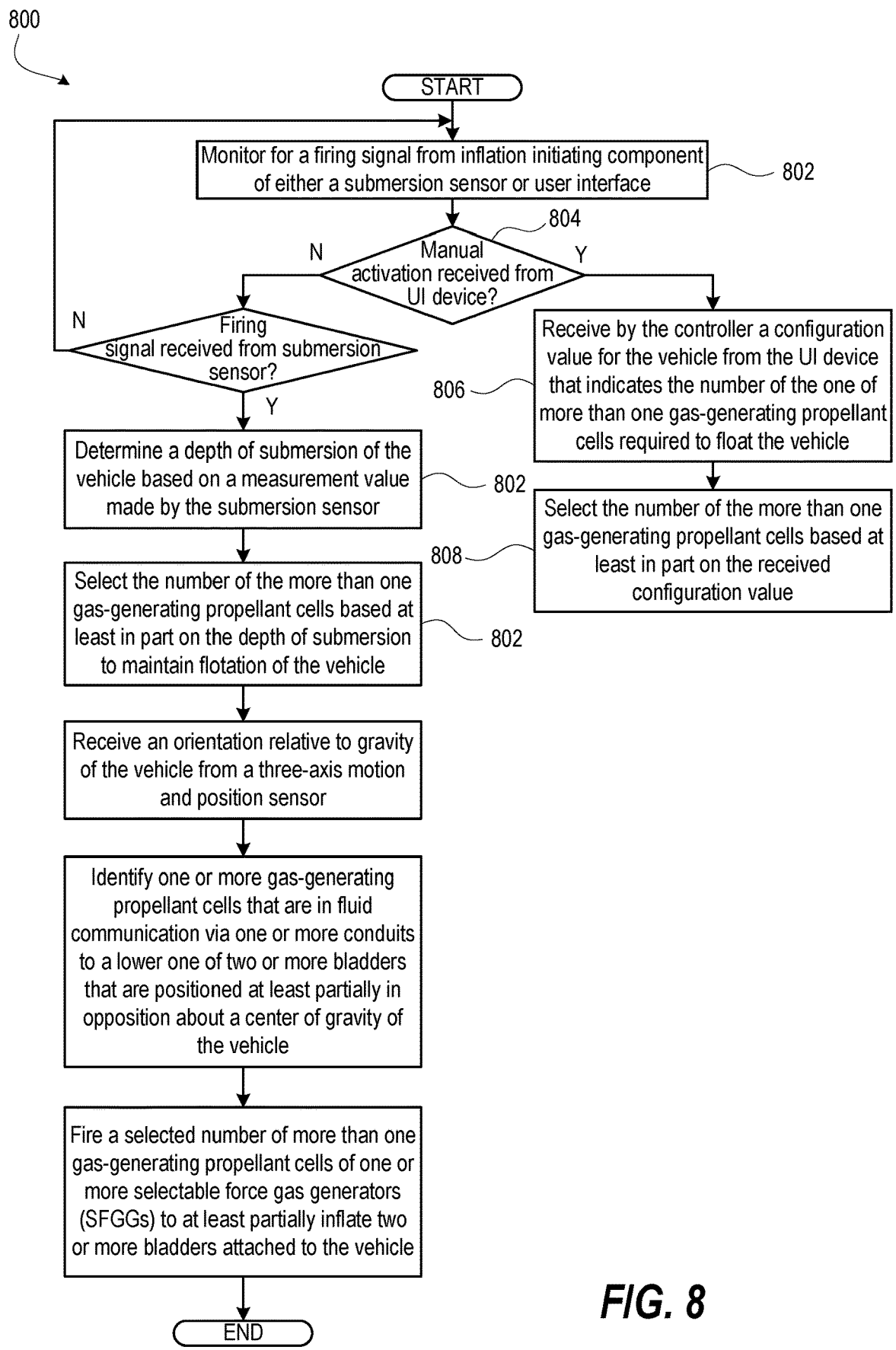
FIG. 8 is a flow diagram of a method for adaptively deploying an emergency flotation system on a vehicle, according to one or more embodiments.

FIG. 8 depicts a flow diagram of a method 800 for adaptively deploying an emergency flotation system on a vehicle that is performed by the emergency vehicle flotation system (100, 400). The method 800 includes monitoring for a firing signal from inflation initiating component of either a submersion sensor or user interface (block 802). A determination is made by the controller, in decision block 804, whether a manual activation of the emergency vehicle flotation system is received from the UI device. In response to determining that a manual activation of the emergency vehicle flotation system is received from the UI device, the method 800 includes receiving by the controller a configuration value for the vehicle from the UI device that indicates the number of the one of more than one gas-generating propellant cells required to float the vehicle (block 806). The method 800 includes selecting the number of the more than one gas-generating propellant cells based at least in part on the received configuration value (block 808). The method 800 includes sequentially firing the selected number of the more than one gas-generating propellant cells based at least in part on limiting peak pressure in the one or more conduits and the one or more bladders (block 810). Then method 800 ends.

In response to determining that a manual activation of the emergency vehicle flotation system is not received from the UI device in decision block 804, the method 800 includes determining, in decision block 812, whether a firing signal is received from the submersion sensor. In response to determining that a firing signal is not received from the submersion sensor, method 800 returns to block 802. In response to determining that a firing signal is received from the submersion sensor, method 800 includes determining a depth of submersion of the vehicle based on a measurement value made by the submersion sensor (block 814). The method 800 includes selecting the number of the more than one gas-generating propellant cells based at least in part on the depth of submersion to maintain flotation of the vehicle (block 816). In one or more embodiments, the method 800 includes receiving an orientation relative to gravity of the vehicle from a three-axis motion and position sensor (block 818). The method 800 includes identifying one or more gas-generating propellant cells that are in fluid communication via one or more conduits to a lower one of two or more bladders that are positioned at least partially in opposition about a center of gravity of the vehicle (block 820). The method 800 includes firing a selected number of more than one gas-generating propellant cells of one or more selectable force gas generators (SFGGs) to at least partially inflate two or more bladders attached to the vehicle (block 822). The method 800 returns to block 814 to adaptively continuing to fire a selected number of gas-generating propellant cells to reduce listing or depth of submersion as required.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An emergency vehicle flotation system comprising:
   one or more bladders attached in a compressed state on a vehicle;
   an inflation initiating component comprising a selected one or more of: (i) a submersion sensor attached to the vehicle to detect water pressure indicative of submersion of the vehicle; and (ii) a user interface (UI) device;
   one or more selectable force gas generators (SFGGs) each comprising more than one gas-generating propellant cells that are individually fired and comprising one or more conduits that receive gas from fired gas-generating propellant cells and direct the gas to inflate at least one of the one or more bladders; and
   a controller communicatively coupled to the inflation initiating component and the more than one gas-generating propellant cells of the one or more SFGGs, the controller enabling the emergency vehicle flotation system to:
      receive an inflation signal from the inflation initiating component; and
      fire a selected number of the more than one gas-generating propellant cells to at least partially inflate the one or more bladders.

2. The emergency vehicle flotation system of claim 1, wherein:
   the inflation initiating component comprises the submersion sensor that indicates a depth of submersion; and
   the controller selects the number of the more than one gas-generating propellant cells based at least in part on the depth of submersion to maintain flotation of the vehicle.

3. The emergency vehicle flotation system of claim 1, wherein the controller enables the emergency vehicle flotation system to:
   receive a configuration value for the vehicle from the UI device that indicates the number of the one of more than one gas-generating propellant cells required to float the vehicle; and
   select the number of the more than one gas-generating propellant cells based at least in part on the received configuration value.

4. The emergency vehicle flotation system of claim 1, wherein the inflation initiating component comprises the UI device that indicates a manual activation of the emergency vehicle flotation system.

5. The emergency vehicle flotation system of claim 1, wherein the controller selects the number of the more than one gas-generating propellant cells to sequentially fire based at least in part on limiting peak pressure in the one or more conduits and the one or more bladders.

6. The emergency vehicle flotation system of claim 1, further comprising a three-axis motion and position sensor that indicates an orientation of the vehicle relative to gravity, wherein:
   the one or more bladders comprises two or more bladders that are positioned at least partially in opposition about a center of gravity of the vehicle;
   the controller is communicatively coupled to the three-axis motion and position sensor and that enables the emergency vehicle flotation system to:
      receive the orientation of the vehicle from the three-axis motion and position sensor;
      identify one or more gas-generating propellant cells that are in fluid communication via the one or more conduits to a lower one of the one or more bladders.

7. The emergency vehicle flotation system of claim 1, wherein each one of the SFGGs comprise:
   a housing attachable to an ejector mechanism of an airborne store support assembly of an aircraft and containing a gas collection chamber;
   support material contained in the housing adjacent to the gas collection chamber; and
   more than one gas-generating propellant cells partially embedded in the support material, each of the more than one gas-generating propellant cells comprising:
      a jacket of material having a convex portion exposed to the gas collection chamber, having a thickness sufficient to withstand increased outer pressure from initiation of another gas-generating propellant cell, and including an orifice through the convex portion,
      a propellant packet contained in the jacket;
      a fire wire electrically connectable to an electrically-fired initiator and electrically connected to the propellant packet, the fire wire transmitting a firing signal that causes the propellant packet to produce gas, and
      a cap positioned between the propellant packet and the jacket and having a tip that blocks the orifice of the jacket from increased outer pressure in the gas collection chamber to prevent sympathetic detonation of the propellant packet.

8. A vehicle comprising:
a vehicle body; and
an emergency vehicle flotation system comprising:
one or more bladders attached in a compressed state on the vehicle body;
an inflation initiating component comprising a selected one or more of: (i) a submersion sensor attached to the vehicle to detect water pressure indicative of submersion of the vehicle; and (ii) a user interface (UI) device;
one or more selectable force gas generators (SFGGs) each comprising more than one gas-generating propellant cells that are individually fired and comprising one or more conduits that receive gas from fired gas-generating propellant cells and direct the gas to inflate at least one of the one or more bladders; and
a controller communicatively coupled to the inflation initiating component and the more than one gas-generating propellant cells of the one or more SFGGs, the controller enabling the emergency vehicle flotation system to:
receive an inflation signal from the inflation initiating component; and
fire a selected number of the more than one gas-generating propellant cells to at least partially inflate the one or more bladders.

9. The vehicle of claim 8, wherein
the inflation initiating component comprises the submersion sensor that indicates a depth of submersion; and
the controller selects the number of the more than one gas-generating propellant cells based at least in part on the depth of submersion to maintain flotation of the vehicle.

10. The vehicle of claim 8, wherein the controller enables the emergency vehicle flotation system to:
receive a configuration value for the vehicle from the UI device that indicates the number of the one of more than one gas-generating propellant cells required to float the vehicle; and
select the number of the more than one gas-generating propellant cells based at least in part on the received configuration value.

11. The vehicle of claim 8, wherein the inflation initiating component comprises the UI device that indicates a manual activation of the emergency vehicle flotation system.

12. The vehicle of claim 8, wherein the controller selects the number of the more than one gas-generating propellant cells to sequentially fire based at least in part on limiting peak pressure in the one or more conduits and the one or more bladders.

13. The vehicle of claim 8, further comprising a three-axis motion and position sensor that indicates an orientation of the vehicle relative to gravity, wherein:
the one or more bladders comprises two or more bladders that are positioned at least partially in opposition about a center of gravity of the vehicle;
the controller is communicatively coupled to the three-axis motion and position sensor and that enables the emergency vehicle flotation system to:
receive the orientation of the vehicle from the three-axis motion and position sensor;
identify one or more gas-generating propellant cells that are in fluid communication via the one or more conduits to a lower one of the one or more bladders.

14. The vehicle of claim 8, wherein each one of the SFGGs comprise:
a housing attachable to an ejector mechanism of an airborne store support assembly of an aircraft and containing a gas collection chamber;
support material contained in the housing adjacent to the gas collection chamber; and
more than one gas-generating propellant cells partially embedded in the support material, each of the more than one gas-generating propellant cells comprising:
a jacket of material having a convex portion exposed to the gas collection chamber, having a thickness sufficient to withstand increased outer pressure from initiation of another gas-generating propellant cell, and including an orifice through the convex portion,
a propellant packet contained in the jacket;
a fire wire electrically connectable to an electrically-fired initiator and electrically connected to the propellant packet, the fire wire transmitting a firing signal that causes the propellant packet to produce gas, and
a cap positioned between the propellant packet and the jacket and having a tip that blocks the orifice of the jacket from increased outer pressure in the gas collection chamber to prevent sympathetic detonation of the propellant packet.

15. A method comprising:
receiving an inflation signal from the inflation initiating component comprising a selected one or more of: (i) a submersion sensor attached to a vehicle to detect water pressure indicative of submersion of the vehicle; and (ii) a user interface (UI) device; and
in response to receiving the inflation signal, firing a selected number of more than one gas-generating propellant cells of one or more selectable force gas generators (SFGGs) to at least partially inflate one or more bladders attached to the vehicle.

16. The method of claim 15, wherein:
receiving the inflation signal comprises receiving the submersion sensor that indicates a depth of submersion; and
selecting the number of the more than one gas-generating propellant cells based at least in part on the depth of submersion to maintain flotation of the vehicle.

17. The method of claim 15, further comprising:
receiving a configuration value for the vehicle from the UI device that indicates the number of the one of more than one gas-generating propellant cells required to float the vehicle; and
selecting the number of the more than one gas-generating propellant cells based at least in part on the received configuration value.

18. The method of claim 15, wherein receiving the inflation initiating component comprises receiving a manual activation of the emergency vehicle flotation system from the UI device.

19. The method of claim 15, further comprising selecting the number of the more than one gas-generating propellant cells to sequentially fire based at least in part on limiting peak pressure in the one or more conduits and the one or more bladders.

20. The method of claim 15, further comprising
receiving an orientation relative to gravity of the vehicle from a three-axis motion and position sensor; and
identifying one or more gas-generating propellant cells that are in fluid communication via one or more conduits to a lower one of two or more bladders that are positioned at least partially in opposition about a center of gravity of the vehicle.

\* \* \* \* \*